US010369468B2

(12) United States Patent
Ikeda et al.

(10) Patent No.: US 10,369,468 B2
(45) Date of Patent: Aug. 6, 2019

(54) INFORMATION PROCESSING APPARATUS, IMAGE GENERATING METHOD, AND PROGRAM

(71) Applicant: Sony Interactive Entertainment Inc., Tokyo (JP)

(72) Inventors: Takakazu Ikeda, Tokyo (JP); Shin Watanabe, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/805,375

(22) Filed: Nov. 7, 2017

(65) Prior Publication Data

US 2018/0161676 A1    Jun. 14, 2018

(30) Foreign Application Priority Data

Dec. 13, 2016    (JP) .................................. 2016-241561

(51) Int. Cl.
*A63F 13/52*    (2014.01)
*G06F 3/01*    (2006.01)
(Continued)

(52) U.S. Cl.
CPC .............. *A63F 13/52* (2014.09); *A63F 13/25* (2014.09); *A63F 13/428* (2014.09);
(Continued)

(58) Field of Classification Search
CPC ........ A63F 13/52; A63F 13/533; A63F 13/25; A63F 13/212; A63F 13/213;
(Continued)

(56) References Cited

U.S. PATENT DOCUMENTS 8,108,092 B2 *  1/2012  Phillips ................ G05D 1/0033
                                                    701/23
2015/0007114 A1 *  1/2015  Poulos .................... G06F 3/012
                                                    715/852

FOREIGN PATENT DOCUMENTS

JP    11-153987 A    6/1999
JP    2012-064010 A    3/2012
(Continued)

OTHER PUBLICATIONS

Japanese Office Action dated Oct. 23, 2018 for the Corresponding Japanese Patent Application No. 2016-241561.

*Primary Examiner* — Kevin Y Kim
(74) *Attorney, Agent, or Firm* — Katten Muchin Rosenman LLP (57) ABSTRACT

An information processing apparatus includes an acquisition block configured to acquire attitude information indicative of an attitude of a head-mounted display worn on a head of a user, a visual-line direction definition block configured to define a visual-line direction in accordance with the attitude information of the head-mounted display, a first image generation block configured to generate a game image of a virtual three-dimensional space that is displayed on the head-mounted display, an acceptance block configured to accept a switching manipulation from the user while the head-mounted display displays the game image, and a second image generation block configured to generate a system menu image that is displayed on the head-mounted display instead of the game image generated by the first image generation block when the acceptance block accepts the switching manipulation.

4 Claims, 9 Drawing Sheets

(51) Int. Cl.

| | |
|---|---|
| *A63F 13/25* | (2014.01) |
| *G06T 19/00* | (2011.01) |
| *A63F 13/428* | (2014.01) |
| *A63F 13/533* | (2014.01) |
| *G06F 3/0481* | (2013.01) |
| *G06F 3/0482* | (2013.01) |
| *A63F 13/212* | (2014.01) |
| *A63F 13/213* | (2014.01) |

(52) U.S. Cl.
CPC ............ *A63F 13/533* (2014.09); *G06F 3/011* (2013.01); *G06F 3/012* (2013.01); *G06F 3/013* (2013.01); *G06F 3/0482* (2013.01); *G06F 3/04815* (2013.01); *G06T 19/003* (2013.01); *A63F 13/212* (2014.09); *A63F 13/213* (2014.09); *G06T 2200/24* (2013.01)

(58) Field of Classification Search
CPC ...... G06F 3/04815; G06F 3/011; G06F 3/012; G06F 3/013; G06F 3/0482; G06T 19/003; G06T 2200/24
See application file for complete search history.

(56) References Cited

FOREIGN PATENT DOCUMENTS

| | | |
|---|---|---|
| JP | 2013-258614 A | 12/2013 |
| JP | 2016-115329 A | 6/2016 |

\* cited by examiner

INFORMATION PROCESSING APPARATUS, IMAGE GENERATING METHOD, AND PROGRAM

BACKGROUND

The present disclosure relates to a technology of generating images to be displayed on a head-mounted display.

A head-mounted display (HMD) is worn on the head of a user so as to provide a video image world of virtual reality (VR). Recently, game playing is practiced in which an HMD is connected to a game machine so as to allow a user to play a game by manipulating a game controller while viewing a game image displayed on the connected HMD. Since an HMD provides a VR image all over the visual field of a user, effects are provided in which the sense of immersion of the user into a video image world is increased and the entertainment of games is remarkably enhanced. By adding a head tracking function to an HMD and generating a game image of a virtual three-dimensional space in cooperation with the attitude of the head of a user, the sense of immersion into a video image world can be further strengthened.

SUMMARY

During game playing, a user wearing an HMD sometimes wants to display a system menu image (or a home image) for executing a manipulation for other than game playing. For example, if a user invites a friend to play a game together or a message comes from a friend, the user discontinues the game and switches a display image to the system menu image. Unlike television receivers, an HMD is capable of providing a 360-degree omnidirectional video image space, so that it is desirable to provide the efficient use of free video image space when the user has switched from a game image to the system menu image.

Therefore, the present disclosure has been done in consideration of the problem described above and it is desirable to provide a technology that is capable of providing information useful for a user when a game image displayed on an HMD is switched to a system menu image.

According to an embodiment of the present disclosure, there is provided an information processing apparatus including an acquisition block configured to acquire attitude information indicative of an attitude of a head-mounted display worn on a head of a user, a visual-line direction definition block configured to define a visual-line direction in accordance with the attitude information of the head-mounted display, a first image generation block configured to generate a game image of a virtual three-dimensional space that is displayed on the head-mounted display, an acceptance block configured to accept a switching manipulation from the user while the head-mounted display displays the game image, and a second image generation block configured to generate a system menu image that is displayed on the head-mounted display instead of the game image generated by the first image generation block when the acceptance block accepts the switching manipulation. The second image generation block arranges a predetermined image in a direction different from a direction in which the system menu image is arranged relative to a viewpoint position in the virtual three-dimensional space.

According to another embodiment of the present disclosure, there is provided an image generation method including acquiring attitude information indicative of an attitude of a head-mounted display worn on a head of a user, defining a visual-line direction in accordance with the attitude information of the head-mounted display, generating a game image of a virtual three-dimensional space that is displayed on the head-mounted display, accepting a switching manipulation from the user while the head-mounted display displays the game image, and generating, on the basis of the defined visual-line direction, images of the virtual three-dimensional space that include a system menu image and a predetermined image arranged in different directions relative to a viewpoint position after acceptance of the switching manipulation.

According to further another embodiment of the present disclosure, there is provided a program for a computer, including by an acquisition block, acquiring attitude information indicative of an attitude of a head-mounted display worn on a head of a user, by a visual-line direction definition block, defining a visual-line direction in accordance with the attitude information of the head-mounted display, by a first image generation block, generating a game image of a virtual three-dimensional space that is displayed on the head-mounted display, by an acceptance block, accepting a switching manipulation from the user while the head-mounted display displays the game image, and by a second image generation block, generating, on the basis of the defined visual-line direction, images of the virtual three-dimensional space that include a system menu image and a predetermined image arranged in different directions relative to a viewpoint position after acceptance of the switching manipulation.

It should be noted that any combinations of the above-mentioned components and the expressions of the present disclosure as converted between a method, an apparatus, a system, a computer program, a recording medium computer-readably recording a computer program, a data structure, and so on are also effective as modes of the present disclosure.

According to the present disclosure, a technology is provided that is capable of providing information useful for a user when a game image displayed on an HMD is switched to a system menu image.

DETAILED DESCRIPTION OF THE PREFERRED EMBODIMENT

Figure 1:
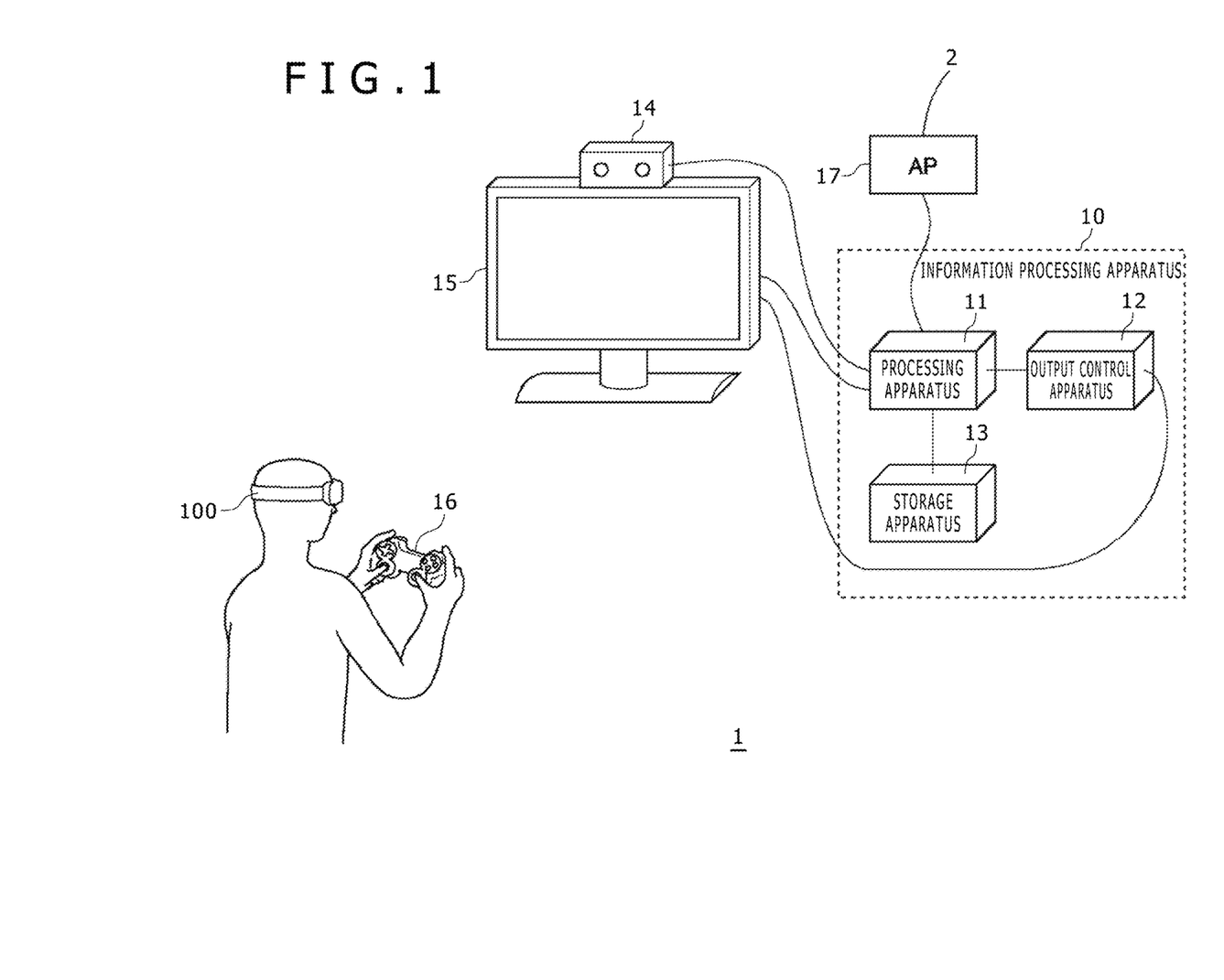
FIG. 1 is a diagram illustrating one example of a configuration of an information processing system in one embodiment.

Referring to FIG. 1, there is depicted a diagram illustrating an example of a configuration of an information processing system 1 in one embodiment. The information processing system 1 includes an information processing apparatus 10, an HMD 100, an input apparatus 16 that is manipulated manually by a user, an image taking apparatus 14 for taking an image of a user wearing the HMD 100, and an output apparatus 15 for displaying an image. The output apparatus 15 may be a television receiver. The information processing apparatus 10 is connected to an external network 2 through an access point (AP) 17. The AP 17 has functions of wireless access point and router and the information processing apparatus 10 may be connected to the AP 17 with a cable or by a known wireless communication protocol.

The HMD 100, worn on the head of a user, provides a video image world of VR to the user. By adding a head tracking function to the HMD 100 and updating a display image in cooperation with the movement of the head of the user, the sense of immersion of the user into a video image world can be enhanced.

The information processing apparatus 10 includes a processing apparatus 11, an output control apparatus 12, and a storage apparatus 13. The processing apparatus 11 is a terminal apparatus that accepts manipulation information entered by the user input through the input apparatus 16 and executes applications such as a game. The processing apparatus 11 and the input apparatus 16 may be interconnected with a cable or by a known wireless communication protocol. It should be noted that the processing apparatus 11 of the present embodiment has functions of accepting the attitude information of the HMD 100 as the information about a manipulation done by the user on the game being played so as to make the game proceed. The output control apparatus 12 is a processing unit for outputting the image data generated by the processing apparatus 11 to the HMD 100 and the output control apparatus 12 and the HMD 100 may be interconnected with a cable or by a known wireless communication protocol.

The image taking apparatus 14 is a stereo camera that takes an image of the user wearing the HMD 100 in a periodic manner and supplies the taken image to the processing apparatus 11. The HMD 100 has a marker (a light-emitting diode (LED) for tracking) for tracking the head of the user, which will be described later, and the processing apparatus 11 detects a movement of the HMD 100 on the basis of a maker positional information included in the taken image. It should be noted that the HMD 100 has an attitude sensor (an acceleration sensor and a gyro sensor) and the processing apparatus 11 gets the sensor data obtained by the attitude sensor from the HMD 100 so as to execute precision tracking processing along with the use of a taken image of the marker. It should also be noted that, for the tracking processing, various methods have been proposed and therefore the processing apparatus 11 may employ any one of these methods as long as the movement of the HMD 100 can be detected.

In order to view an image through the HMD 100, the user wearing the HMD 100 may not need to have the output apparatus 15; however, the arrangement of the output apparatus 15 allows another user to view a display image on the output apparatus 15. The output control apparatus 12 or the processing apparatus 11 may display the same image as that viewed by the user wearing the HMD 100 or another image on the output apparatus 15. For example, if the user wearing an HMD and another user play the same game together, then the output apparatus 15 may display a game image as viewed from the character's point of view of this another user.

The HMD 100 is a display apparatus worn on the head of each user so as to display an image on a display panel in front of the eyes of the user. The HMD 100 individually displays an image for the left eye on the left-eye display panel and an image for the right eye on the right-eye display panel. These images constitute a parallax image as viewed from the left and right viewpoints, thereby realizing a stereoscopic vision. It should be noted that, since a user views the display panels through optical lenses, the information processing apparatus 10 supplies the parallax image data corrected in the optical distortion caused by the lens to the HMD 100. The processing of this optical distortion correction may be done by any one of the processing apparatus 11 and the output control apparatus 12.

The processing apparatus 11, the storage apparatus 13, the output apparatus 15, the input apparatus 16, and the image taking apparatus 14 may constitute a related-art game system. In this case, the processing apparatus 11 is a game apparatus for executing a game and the input apparatus 16 is a device for supplying the information about the manipulation done by a user to the processing apparatus 11 such as a game controller, a keyboard, a mouse, and a joystick. The storage apparatus 13 stores system software and game software programs for example. Adding the output control apparatus 12 and the HMD 100 to the components of this game system allows the construction of the information processing system 1 that provides the VR images in a virtual three-dimensional space to the HMD 100.

It should be noted that the functions of the output control apparatus 12 may be built in the processing apparatus 11. To be more specific, the processing units of the information processing apparatus 10 may be configured by one unit of the processing apparatus 11 or by the processing apparatus 11 and the output control apparatus 12. In what follows, the functions of providing VR images to the HMD 100 will be collectively described as the functions of the information processing apparatus 10.

With a game of the present embodiment, a user character is moved inside a virtual three-dimensional space on the basis of the manipulation information entered from the input apparatus 16 and the visual-line direction of the user character is determined on the basis of the attitude information of the HMD 100 worn on the head of a user. In the present embodiment, the attitude information of the HMD 100 is used in the game for the manipulation information for controlling the visual-line direction of the user character, but the input information in the input apparatus 16 may be used as the manipulation information for controlling the visual-line direction. Further, for the manipulation information for moving the user character, the positional information of the HMD 100 may be used instead of the input information of the input apparatus 16. In the present embodiment, the manipulation information of the user character may be acquired from any one of the input apparatus 16 and the HMD 100 or another user interface.

By executing the head tracking processing of a user, the information processing apparatus 10 detects the positional coordinate and attitude of the head (actually, the HMD 100) of the user. It should be noted here that the positional coordinate of the HMD 100 denotes a positional coordinate in a three-dimensional space with the reference position being the origin; this reference position may be the positional coordinate (latitude and longitude) that is provided when the power to the HMD 100 is turned on. Further, the attitude of the HMD 100 is a tilt in three-axis directions relative to a reference attitude in a three-dimensional space. It should be noted that the reference attitude is an attitude in which the visual-line direction of the user is in the horizontal direction; this reference attitude may be set when the power to the HMD 100 is turned on.

The information processing apparatus 10 is capable of detecting the positional coordinate and attitude of the HMD 100 only from the sensor data detected by the attitude sensor of the HMD 100; in addition, by executing image analysis on the marker (the LED for tracking) of the HMD 100 taken with the image taking apparatus 14, the information processing apparatus 10 is capable of detecting the positional coordinate and attitude of the HMD 100 with high precision. As described above, the information processing apparatus 10 may compute the position of the user character inside a virtual three-dimensional space on the basis of the positional information of the HMD 100 so as to compute the visual-line direction of the user character on the basis of the attitude information. However, in the present embodiment, the position of the user character inside a virtual three-dimensional space is computed on the basis of the manipulation information of the input apparatus 16.

Figure 2:
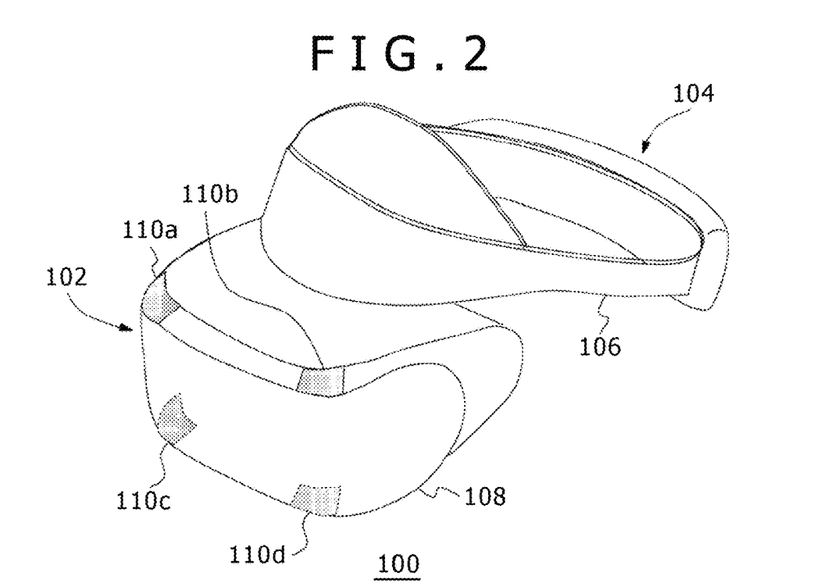
FIG. 2 is a diagram illustrating one example of an external shape of an HMD.

Referring to FIG. 2, there is depicted a diagram illustrating an example of an external shape of the HMD 100. The HMD 100 includes an output mechanism block 102 and a wearing mechanism block 104. The wearing mechanism block 104 includes a wearing band 106 that fixes the HMD 100 on the head of the user by setting around the head of the user when the user wears the HMD 100. The wearing band 106 is made of a material or has a structure that allows the user to adjust the length according to the head circumference of the user.

The output mechanism block 102 includes a housing 108 having a shape that covers the left and right eyes of the user in a state where the user wears the HMD 100, a display panel being arranged in front of the eyes inside the housing 108 when the user wears the HMD 100. This display panel may be a liquid crystal panel or an organic electroluminescence (EL) panel, for example. Additionally arranged inside the housing 108 are a pair of optical lenses for enlarging, as being positioned between the display panel and the eyes of the user, the viewing angle of the user. Further, the HMD 100 may have a speaker or an earphone at a position opposite to an ear of the user or may be configured to be connected with an externally attached headphone.

The housing 108 externally has a light-emitting markers 110a, 110b, 110c, and 110d. In this example, an LED for tracking makes up the light-emitting marker 110; however, it is also practicable to use marker of other types. Details aside, any markers are available as long as these markers can be imaged with the image taking apparatus 14 and the marker positions can be image-analyzed by the information processing apparatus 10. The number of light-emitting markers 110 and the arrangement thereof are not restricted; however, it may be necessary to provide the number and arrange that are enough for the detection of the attitude of the HMD 100. In the illustrated example, four light-emitting markers 110 are arranged in the four corners of the front surface of the housing 108. In addition, in order to allow image taking also when the user directs his or her back toward the image taking apparatus 14, the light-emitting markers 110 may be arranged on a side section or a rear section of the wearing band 106.

The HMD 100 may be connected to the information processing apparatus 10 with a cable or by a known wireless communication protocol. The HMD 100 transmits the sensor data detected by the attitude sensor to the information processing apparatus 10 and receives the image data generated by the information processing apparatus 10, thereby displaying the images on the left-eye display panel and the right-eye display panel.

Figure 3:
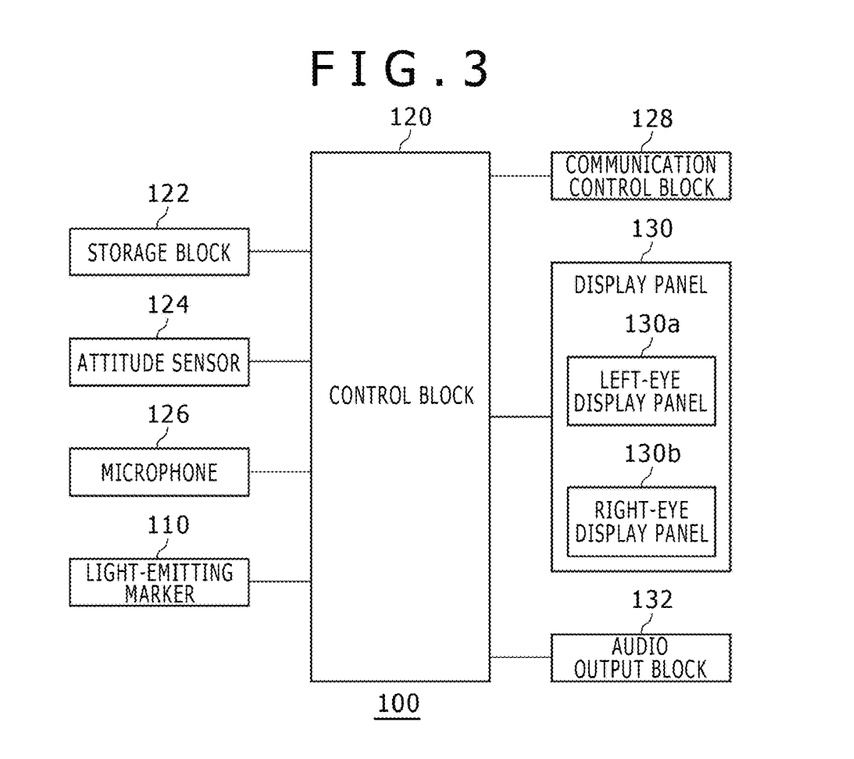
FIG. 3 is a functional block diagram illustrating the HMD.

Referring to FIG. 3, there is depicted a functional block diagram illustrating the HMD 100. A control block 120 is a main processor that processes data of various kinds such as image data, audio data, and sensor data, and instructions and outputs the results of the processing. A storage block 122 temporarily stores the data and instructions that are processed by the control block 120. An attitude sensor 124 detects the attitude information of the HMD 100. The attitude sensor 124 at least includes a three-axis acceleration sensor and a three-axis gyro sensor.

A communication control block 128 transmits the data outputted from the control block 120 to the external information processing apparatus 10 through a network adaptor or an antenna in wired or wireless communication. In addition, the communication control block 128 receives the data from the information processing apparatus 10 through the network adaptor or the antenna in wired or wireless communication and outputs the received data to the control block 120.

Receiving image data and audio data from the information processing apparatus 10, the control block 120 supplies the received image data to a display panel 130 for displaying an image and the received audio data to an audio output block 132 for outputting sound. The display panel 130 is made up of a left-eye display panel 130a and a right-eye display panel 130b, displaying a pair of parallax images to the respective display panels. Further, the control block 120 transmits the sensor data from the attitude sensor 124 and the audio data from a microphone 126 from the communication control block 128 to the information processing apparatus 10.

Figure 4:
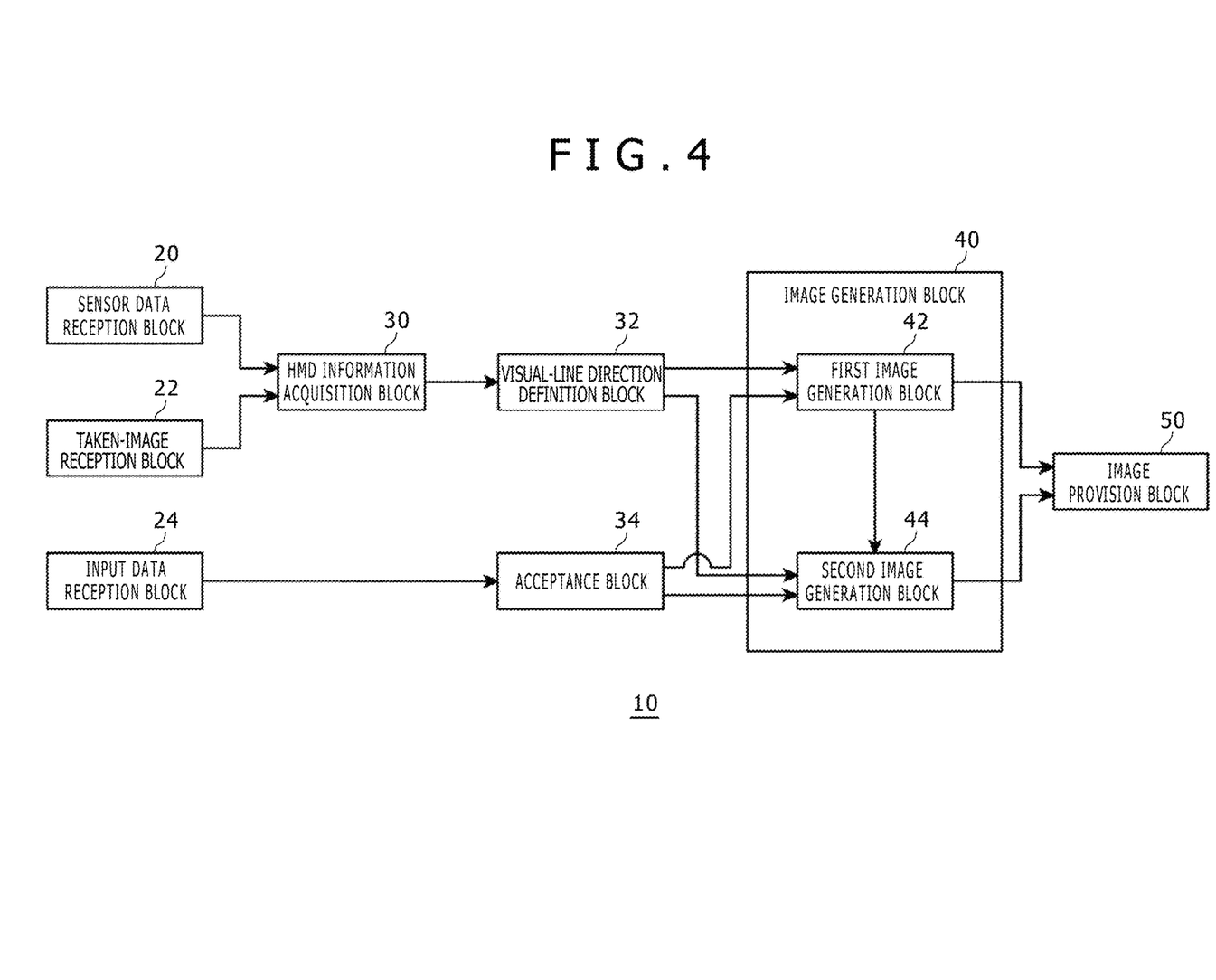
FIG. 4 is a functional block diagram illustrating an information processing apparatus.

Referring to FIG. 4, there is depicted a functional block diagram illustrating the information processing apparatus 10. The information processing apparatus 10 includes a sensor data reception block 20, a taken-image reception block 22, an input data reception block 24, and an image provision block 50 as the input/output interfaces with the outside. Further, the information processing apparatus 10 includes an HMD information acquisition block 30, a visual-line direction definition block 32, an acceptance block 34, and an image generation block 40. The image generation block 40 includes a first image generation block 42 for generating a game image by executing a game and a second image generation block 44 for generating a system menu image.

In FIG. 4, the components described as functional blocks for executing various processing operations can be configured by circuit blocks, memories, and other large-scale integrations (LSIs) in a hardware approach and realized by programs and so on loaded in memories in a software approach. Therefore, these functional blocks can be realized by various forms, namely, only hardware, only software, or combinations thereof can be understood by those skilled in the art and these functional blocks are not limited to any one of these forms.

The following describes an operation of the information processing apparatus 10 to be executed when generating an image of a first-person shooter (FPS) game.

Figure 5:
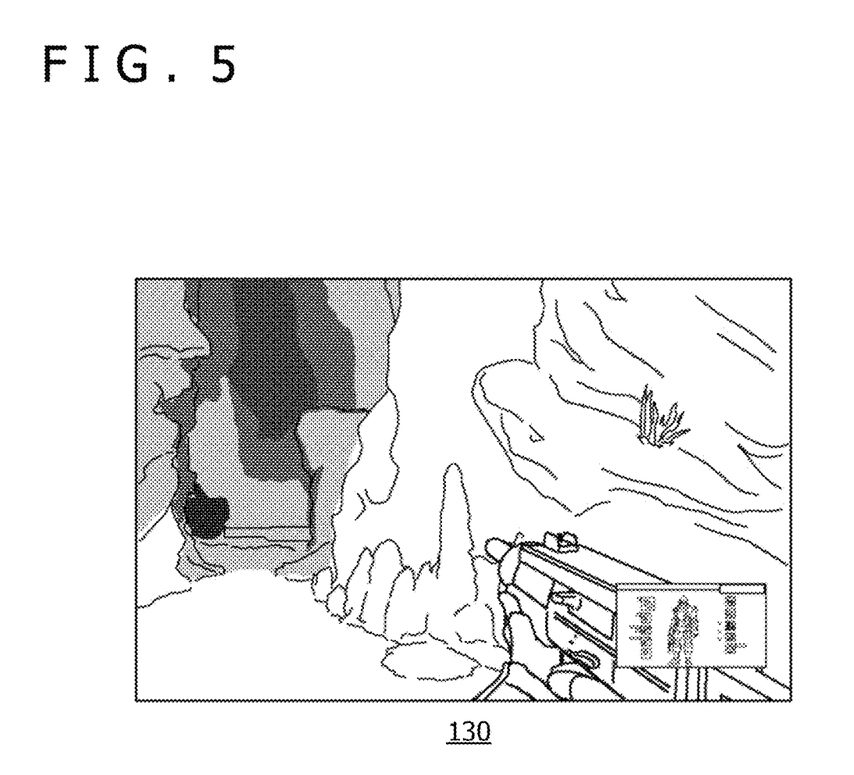
FIG. 5 is a diagram illustrating one example of a game image displayed on the HMD.

Referring to FIG. 5, there is depicted a diagram illustrating an example of a game image that is displayed on the HMD 100.

The first image generation block 42 generates a game image for the left eye and a game image for the right eye and the image provision block 50 provides the generated game images to the HMD 100 to display on the display panel 130.

The sensor data reception block 20 receives, with a predetermined period of time, the sensor data from the attitude sensor 124 of the HMD 100 worn by the user and supplies the received sensor data to the HMD information acquisition block 30. The taken-image reception block 22 receives an image obtained by taking the HMD 100 with a predetermined period of time from the image taking apparatus 14 and supplies the received image to the HMD information acquisition block 30. For example, the image taking apparatus 14 takes the front space every 1/60 second and the taken-image reception block 22 receives the taken image every 1/60 second. In the present embodiment, the HMD information acquisition block 30 acquires the sensor data and the taken image as the attitude information indicative of an attitude of the HMD 100 worn on the head of the user. The HMD information acquisition block 30 supplies the acquired attitude information to the visual-line direction definition block 32.

The visual-line direction definition block 32 defines the visual-line direction of the user in accordance with the attitude information of the HMD 100. To be more specific, the HMD information acquisition block 30 detects a change in the attitude of the HMD 100 from the sensor data of the attitude sensor 124. At this moment, the HMD information acquisition block 30 may identify an attitude change of the HMD 100 from the sensor data of the three-axis gyro sensor. It should be noted that, desirably, the HMD information acquisition block 30 further uses image taking results of the light-emitting marker 110 for tracking so as to enhance the detection accuracy of the attitude changes. The visual-line direction definition block 32 provides the determined visual-line direction to the first image generation block 42.

The input data reception block 24 receives the key data entered by the user from the input apparatus 16 and supplies the received key data to the acceptance block 34. The acceptance block 34 provides this key data to the first image generation block 42 as the manipulation information for the game.

The first image generation block 42 uses the visual-line direction provided from the visual-line direction definition block 32 as the manipulation information for defining the visual line of the user character. The first image generation block 42 uses the key data supplied from the acceptance block 34 as the manipulation information for defining a motion of the user character. For the processing of making a character inside a virtual three-dimensional space move by manipulating the input apparatus 16, a known technology may be used. The first image generation block 42 moves the user character in a virtual three-dimensional space and executes virtual three-dimensional space rendering processing on the basis of the position (virtual three-dimensional space coordinate value) and visual-line direction of the user character. To be more specific, the first image generation block 42 arranges a virtual camera of which optical axis set to the visual line of the user character at the position of the user character and gets an image of this virtual camera, thereby generating a game image of a virtual three-dimensional space to be displayed on the HMD 100. The image provision block 50 provides the generated image data to the HMD 100.

In the FPS game of the present embodiment, the visual-line direction of the character can be changed by the user by making the character move by key input through the input apparatus 16 by moving the direction of the HMD 100. In this game, the user can 360-degree omni-directionally move and can 360-degree omni-directionally view; in this sense, the HMD 100 is used as a display apparatus that can display all directions of a game virtual space.

During game playing, the user sometimes wants to display the system menu image on the HMD 100 by discontinuing the game. At this moment, the user can manipulate a predetermined button (the home button) of the input apparatus 16 to switch the game image being displayed on the display panel 130 to the system menu image. That is, when the user manipulates the home button of the input apparatus 16 while the display panel 130 displays a game image, the manipulation of the home button is entered in the information processing apparatus 10 as a display image switching manipulation.

When the input data reception block 24 receives the manipulation data of the home button, the acceptance block 34 accepts the manipulation data of the home button as an image switching manipulation, thereby supplying an image switching instruction to the image generation block 40. In the image generation block 40, the first image generation block 42 pauses the game progression on the basis of the image switching instruction. At the same time, on the basis of the image switching instruction, the second image generation block 44 generates the system menu image that is displayed on the HMD 100 instead of the game image generated by the first image generation block 42.

Figure 6:
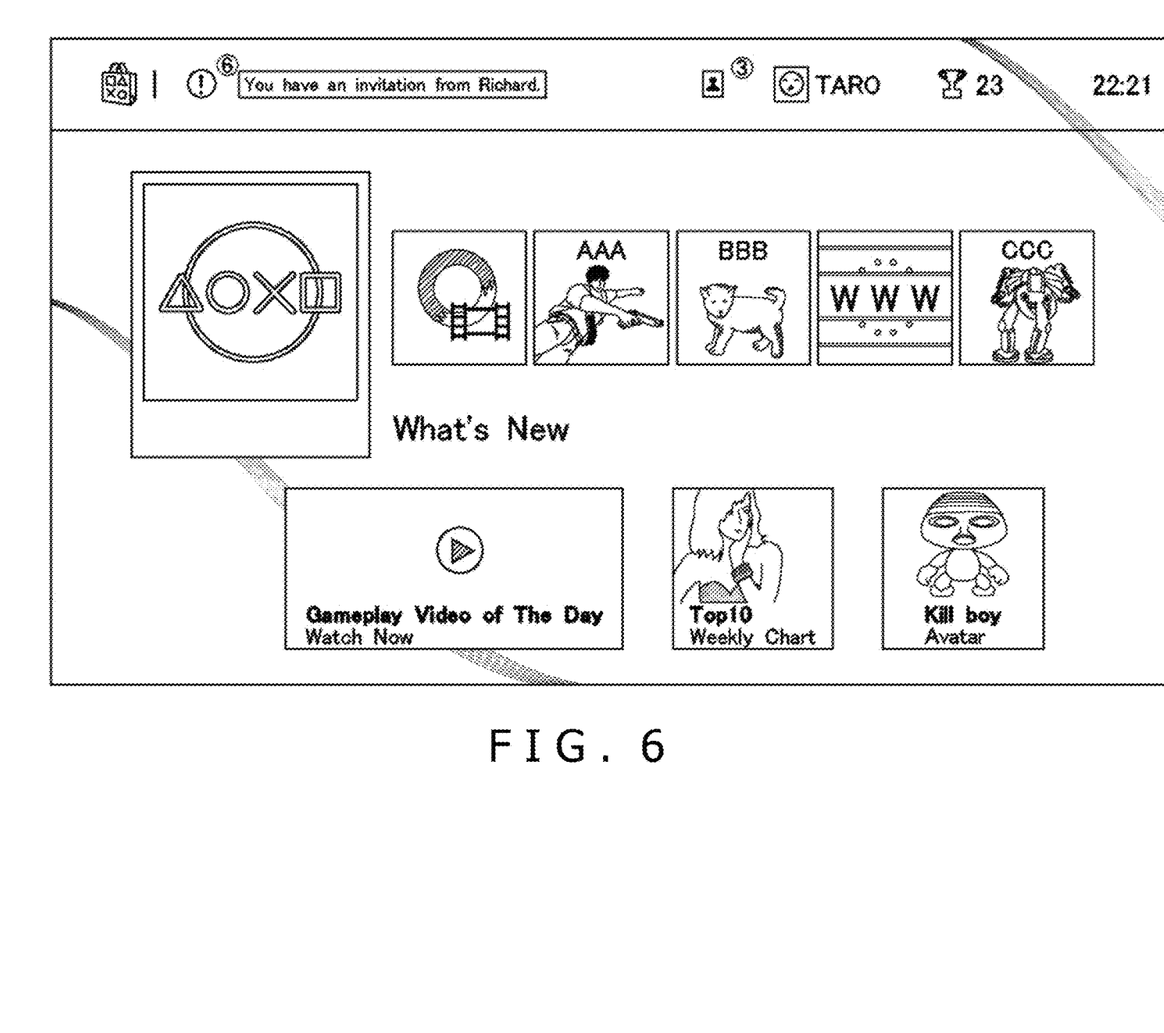
FIG. 6 is a diagram illustrating one example of a system menu image that is rectangle in shape.

Referring to FIG. 6, there is depicted a diagram illustrating an example of a rectangular system menu image that is generated by the second image generation block 44. The second image generation block 44 arranges, in an upper system area, two or more icons indicative of two or more system functions provided by the information processing apparatus 10. Further, the second image generation block 44 arranges, in a middle icon area, icons representative of the content stored in the storage apparatus 13. The system menu image may be the same as the system menu image used in a game system of a related-art type. The second image generation block 44 generates a system menu image and the image provision block 50 provides the system menu image to the HMD 100.

Figure 7:
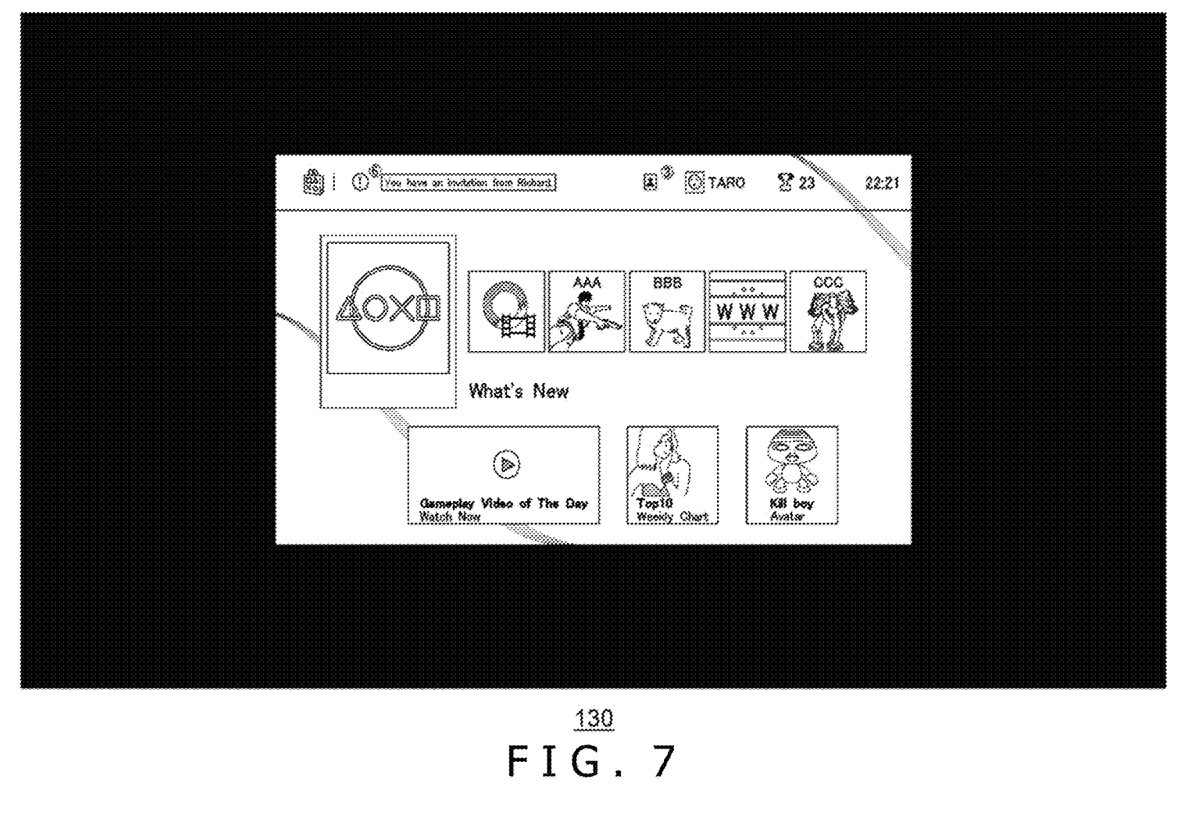
FIG. 7 is a diagram illustrating one example of a system menu image displayed on the HMD.

Referring to FIG. 7, there is depicted a diagram illustrating an example of a system menu image that is displayed on the HMD 100.

The second image generation block 44 builds a virtual three-dimensional space with a system menu image arranged. The second image generation block 44 arranges the system menu image in a virtual three-dimensional space such that a center portion in the lateral direction of the system menu image is positioned in the first direction relative to the viewpoint position of the user in the virtual three-dimensional space. Here, the first direction is set in the direction of the visual line of the user when the acceptance block 34 accepts an image switching manipulation. At this moment, the second image generation block 44 desirably arranges the system menu image in the virtual three-dimensional space such that the first direction orthogonally crosses the center of the rectangular system menu image. Consequently, when the user manipulates the home button of the input apparatus 16 during game playing so as to switch the game image to the system menu image, the system menu image is displayed in front of the user. That is, when the user manipulates the home button while the game image is displayed, the system menu image is displayed in front of the user. Consequently, the user is able to execute as desired menu manipulation by use of the input apparatus 16 without moving the visual line of the user.

As depicted in FIG. 7, in the virtual three-dimensional space, the system menu image is displayed as one sheet of two-dimensional image. When a two-dimensionally represented system menu image is displayed all over the display panel 130, it is known that the user may not objectively view the system menu image, thereby making the manipulation difficult. Hence, the system menu image is displayed not all over the display panel 130 but is displayed with an angular field narrower than the display panel 130. It should be noted that the free spaces are filled in a unicolor manner; here, in order to enhance the visibility of the system menu image, the outside of the system menu image is all blackened.

The second image generation block 44 arranges a predetermined image in the second direction that is different from the first direction in which the system menu image is arranged, relative to a viewpoint position in a virtual three-dimensional space. At this moment, the second image generation block 44 arranges the predetermined image in the virtual three-dimensional space such that the central portion in the lateral direction of the predetermined image is positioned in the second direction. The image to be arranged in the second direction may be either an image related with a game played by the user or an image that reminds the user of a situation of the game played by the user before the image switching. Being provided with a screen shot of a game image at the time of acceptance of an image switching manipulation by the reception block 34, the second image generation block 44 may arrange, as a predetermined image, a screen shot of a game image as it was before the image switching.

Figure 8:
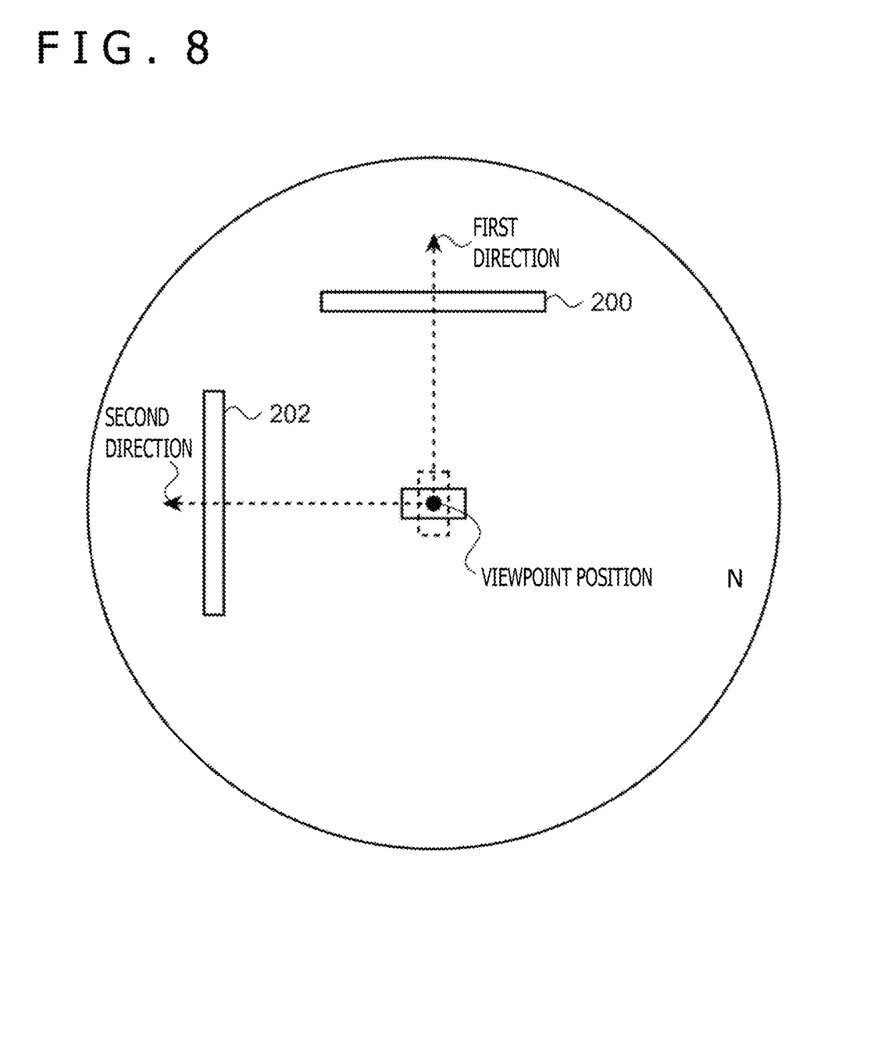
FIG. 8 is a diagram for describing an arrangement of images in a virtual three-dimensional space.

Referring to FIG. 8, there is depicted a diagram illustrating an arrangement of each image in a virtual three-dimensional space. The second image generation block 44 forms a virtual sphere around a viewpoint position; FIG. 8 depicts this virtual sphere as viewed from above. The second image generation block 44 arranges a system menu image 200 in the virtual sphere such that a first-direction vector from the viewpoint position orthogonally crosses the center of the system menu image 200. In addition, the second image generation block 44 arranges a screen shot image 202 in the virtual sphere such that second-direction vector from the viewpoint position orthogonally crosses the center of the screen shot image 202.

In the arrangement example depicted in FIG. 8, the screen shot image 202 is arranged at a position of 90 degrees counterclockwise relative to the system menu image 200. Hence, when the user turns his or her head 90 degrees to the left side from a state (refer to FIG. 7) in which the user views the system menu image 200 in the front, the screen shot image 202 is displayed on the display panel 130 in the front.

Figure 9:
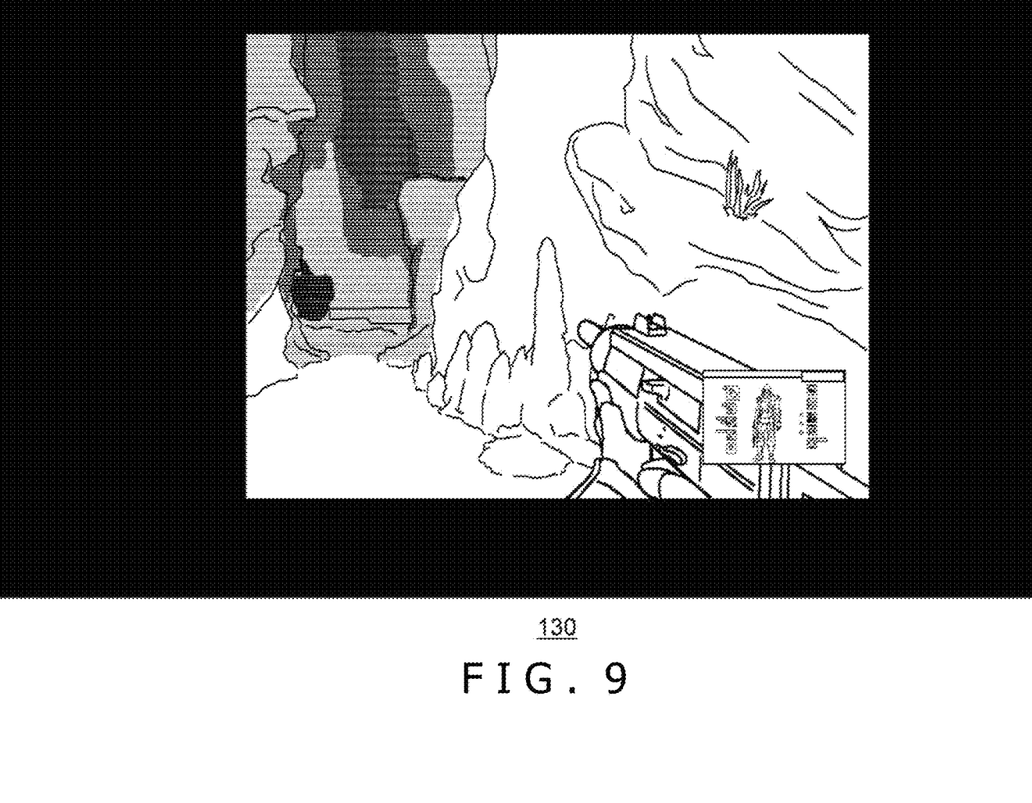
FIG. 9 is a diagram illustrating one example of a screen shot image displayed on the HMD.

Referring to FIG. 9, there is depicted a diagram illustrating an example of a screen shot image that is displayed on the HMD 100.

When switching the system menu screen to a game image, the user may manipulate the home button of the input apparatus 16 again. However, if the home button is manipulated again, the game is instantly restarted, so that, unless the user remembers the details of the situation of the game as it was before pausing, it is difficult for the user to be immersed in the game again, thereby making it possible for the game to progress disadvantageously for the user. Therefore, the second image generation block 44 arranges the screen shot image 202 in a direction different from that of the system menu image 200 in advance in the virtual three-dimensional space, and when the user turns the head to turn the HMD 100 to the left side, the screen shot image 202 is displayed on the display panel 130. Consequently, the user is able to be sure of the situation of the game as it was before pausing, thereby returning to the game without problem.

As described above, according to the information processing system 1 of the present embodiment, after the acceptance of an image switching manipulation by the acceptance block 34 while the user plays a game, the second image generation block 44 generates, on the basis of the visual-line direction defined by the visual-line direction definition block 32, such images of a virtual three-dimensional space as the system menu image 200 and the screen shot image 202 arranged in different directions relative to the viewpoint position. Arranging the screen shot image 202 in a virtual three-dimensional space allows the effective use of the virtual three-dimensional space and the provision of useful information to the user.

Figure 10:
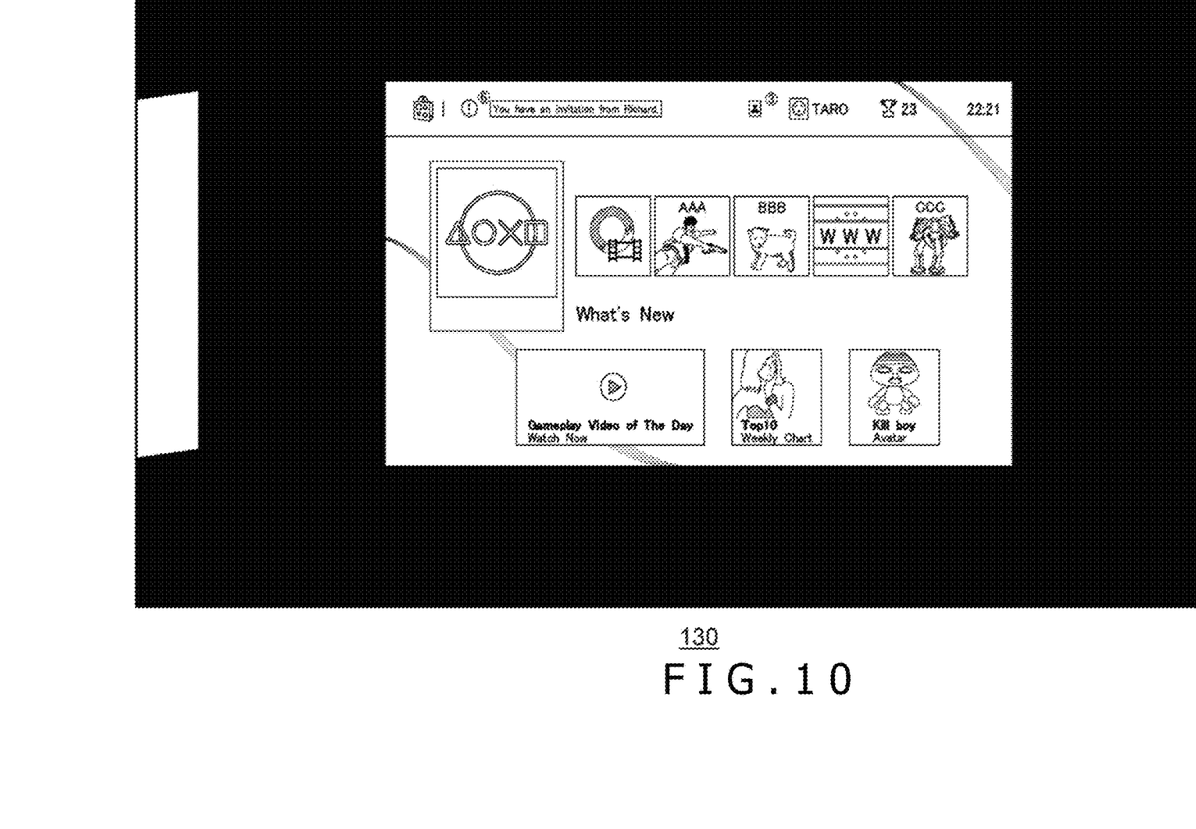
FIG. 10 is a diagram illustrating a system menu image displayed on the HMD.

Referring to FIG. 10, there is depicted a diagram illustrating an example of a system menu image that is displayed on the HMD 100.

In FIG. 10, a screen shot image is partially displayed on the left end of the display panel 130. Compared with the display example depicted in FIG. 7, whether or not the partial display of the screen shot image is done depends upon the direction of the arrangement of the screen shot image 202 relative to the system menu image 200. In the arrangement example depicted in FIG. 8, the screen shot image 202 is arranged at a position of 90 degrees counterclockwise relative to the system menu image 200; however, the arrangement at a position 45 degrees counterclockwise displays a part of the screen shot image when the system menu image is displayed in the front.

Seeing a part of a screen shot image along with the whole system menu image, the use is advantageous in that the user need not search for the position of the screen shot image. It should be note that, in order to achieve a substantially similar advantage, the second image generation block 44 may include an indicator indicative of the position of the screen shot image in the screen in the screen example depicted in FIG. 7. This indicator may be indicative of an arrow marker for example or the display position of the screen shot image may be indicated by text.

While preferred embodiment of the present disclosure has been described using specific terms, such description is for illustrative purpose, and it is to be understood by those skilled in the art that changes and variations may be made without departing from the spirit or scope of the following claims.

In the above description, in the present embodiment, when the user turns to the left side from the state in which the system menu image is displayed, a screen shot image is displayed on the display panel 130. The positional relations of the two images in a virtual sphere are not limited to those described above; for example, a screen shot image may be displayed when the user turns to the right side, upward, or in an oblique direction. It has also described above that the second image generation block 44 arranges a system menu image and a screen shot image inside a virtual sphere; however, the second image generation block 44 may further arrange another image.

In addition, the second image generation block 44 may display a game image corresponding to the visual-line directions of the user, instead of displaying the screen shot image 202. In this case, with the position of the frame of the image fixed, the second image generation block 44 may display the game image generated by the first image generation block 42 corresponding to a visual-line direction into the frame. For example, when the user manipulates the home button with the visual line of the user directed to the game image displayed in the frame, the first image generation block 42 generates the game image by use of this visual-line direction. Consequently, the user is able to return to the game playing from the game image displayed in the frame.

The present disclosure contains subject matter related to that disclosed in Japanese Priority Patent Application JP 2016-241561 filed in the Japan Patent Office on Dec. 13, 2016, the entire content of which is hereby incorporated by reference.

What is claimed is:

1. An information processing apparatus comprising:
an acquisition block configured to acquire attitude information indicative of an attitude of a head-mounted display worn on a head of a user,
wherein the head-mounted display displays a stereoscopic image on a display panel in front of eyes of the user through optical lenses;
a visual-line direction definition block configured to define a visual-line direction in accordance with the attitude information of the head-mounted display;
a first image generation block configured to generate a game image of a virtual three-dimensional space that is displayed on the display panel of the head-mounted display;
an acceptance block configured to accept a switching manipulation from the user while the head-mounted display displays the game image; and
a second image generation block configured to pause the game image when the switching manipulation is received from the user and to generate a system menu image that is displayed in a center of the display panel of the head-mounted display when the acceptance block accepts the switching manipulation,
wherein an entire area of the display panel surrounding the system menu image and not displaying the menu image displays a single color,
wherein the second image generation block arranges a predetermined image in a direction different from a direction in which the system menu image is arranged relative to a viewpoint position in the virtual three-dimensional space,
wherein the predetermined image is a screenshot of the game image at a time that the game image was paused by the second image generation block.

2. The information processing apparatus according to claim 1,
wherein the predetermined image is positioned in the virtual three-dimensional space in a direction orthogonal to a viewpoint position when the system menu image is displayed.

3. An image generation method comprising:
acquiring attitude information indicative of an attitude of a head-mounted display worn on a head of a user,
wherein the head-mounted display displays a stereoscopic image on a display panel in front of eyes of the user through optical lenses;
defining a visual-line direction in accordance with the attitude information of the head-mounted display;
generating a game image of a virtual three-dimensional space that is displayed on the display panel of the head-mounted display;
accepting a switching manipulation from the user while the head-mounted display displays the game image;
pausing the game image when the switching manipulation is received from the user;
displaying, at a center of the display panel, a system menu image,
wherein an entire area of the display panel surrounding the system menu image and not displaying the menu image displays a single color; and
displaying, in the virtual three-dimensional space, a predetermined image in a direction different from a direction in which the system menu image is arranged relative to a viewpoint position in the virtual three-dimensional space,
wherein the predetermined image is a screenshot of the game image at a time that the game image was paused.

4. A non-transitory computer readable medium having stored thereon a program for a computer, the program comprising:
by an acquisition block, acquiring attitude information indicative of an attitude of a head-mounted display worn on a head of a user,
wherein the head-mounted display displays a stereoscopic image on a display panel in front of eyes of the user through optical lenses;
by a visual-line direction definition block, defining a visual-line direction in accordance with the attitude information of the head-mounted display;
by a first image generation block, generating a game image of a virtual three-dimensional space that is displayed on the display panel;
by an acceptance block, accepting a switching manipulation from the user while the head-mounted display displays the game image; and
by a second image generation block, pausing the game image when the switching manipulation is received from the user and displaying, at a center of the display panel, a system menu image surrounded by a border formed from a single color occupying a remainder of the display panel.

* * * * *